(12) United States Patent
Hentschke

(10) Patent No.: US 12,275,112 B2
(45) Date of Patent: Apr. 15, 2025

(54) METHOD OF PROCESSING PROFILES IN A PROFILE PROCESSING ASSEMBLY AND A PROFILE INFEED ASSEMBLY FOR TRANSPORTING PROFILES TOWARDS A WORKING MACHINE

(71) Applicant: VOORTMAN STEEL MACHINERY HOLDING B.V., Rijssen (NL)

(72) Inventor: Paul Hentschke, Borne (NL)

(73) Assignee: VOORTMAN STEEL MACHINERY HOLDING B.V., Rijssen (NL)

( * ) Notice: Subject to any disclaimer, the term of this patent is extended or adjusted under 35 U.S.C. 154(b) by 341 days.

(21) Appl. No.: 17/431,958

(22) PCT Filed: Mar. 6, 2020

(86) PCT No.: PCT/NL2020/050150
§ 371 (c)(1),
(2) Date: Aug. 18, 2021

(87) PCT Pub. No.: WO2020/185071
PCT Pub. Date: Sep. 17, 2020

(65) Prior Publication Data
US 2022/0168859 A1 Jun. 2, 2022

(30) Foreign Application Priority Data
Mar. 8, 2019 (NL) ...................................... 2022698

(51) Int. Cl.
*B23Q 7/00* (2006.01)
*B23Q 7/05* (2006.01)
(Continued)

(52) U.S. Cl.
CPC .............. *B23Q 7/001* (2013.01); *B23Q 7/05* (2013.01); *B23Q 7/1484* (2013.01); *B23Q 17/20* (2013.01); *B23Q 17/2471* (2013.01)

(58) Field of Classification Search
CPC ........ B23Q 7/001; B23Q 7/05; B23Q 7/1484; B23Q 17/20; B23Q 2240/007; B23Q 7/06; B23Q 7/1442
See application file for complete search history.

(56) References Cited

U.S. PATENT DOCUMENTS 5,970,830 A * 10/1999 von Niederhausern ..................... B23B 13/02
82/126

FOREIGN PATENT DOCUMENTS

| EP | 1 516 696 A1 | 3/2005 | |
| EP | 2 090 397 A1 | 8/2009 | |
| SE | 508479 C2 * | 10/1998 | ............. B27B 31/06 |

OTHER PUBLICATIONS

VoortmanMachinery, "CNC Flat and Angle Machine | Punching | Shearing | Drilling | Voortman 550-7", YouTube, Jul. 7, 2017, URL: https://www.youtube.com/watch?v=y4EI8eoBNwY (Year: 2017).*
(Continued)

*Primary Examiner* — Jacob J Cigna
(74) *Attorney, Agent, or Firm* — Birch, Stewart, Kolasch & Birch, LLP

(57) ABSTRACT

A method of processing profiles in a profile processing assembly includes a working machine and a profile infeed assembly. The profile infeed assembly includes an infeed cross transport assembly, and an infeed conveyor assembly with an infeed conveyor and a measuring truck. The infeed conveyor has a first end remote from the working machine. The infeed cross transport assembly supplies individual profiles to the infeed conveyor assembly. The infeed conveyor assembly supplies individual profiles to the working machine by means of a measuring truck which engages a profile and moves the profile over the infeed conveyor to the working machine. The method includes determining the longitudinal position of a first end of a profile that is facing
(Continued)

away from the working machine and moving the measuring truck to an optimal rest position which is closest to the first end of the profile to be fed onto the infeed conveyor.

9 Claims, 5 Drawing Sheets

(51) Int. Cl.
    *B23Q 7/14*     (2006.01)
    *B23Q 17/20*     (2006.01)
    *B23Q 17/24*     (2006.01)

(56) References Cited

OTHER PUBLICATIONS

English Translation of SE-508479-C2 (Year: 1993).*
International Search Report for PCT/NL2020/050150 mailed on Jun. 9, 2020.
VoortmanMachinery, "Voortman V505-160T—cross transports with integrated magnets", YouTube, Sep. 22, 2015, p. 1, XP054979947.
VoortmanMachinery, "Voortman V505-160T—fast servo driven gripper truck", YouTube, Sep. 22, 2015, p. 1, XP054979948.
Written Opinion of the International Searching Authority for PCT/NL2020/050150 mailed on Jun. 9, 2020.

* cited by examiner

METHOD OF PROCESSING PROFILES IN A PROFILE PROCESSING ASSEMBLY AND A PROFILE INFEED ASSEMBLY FOR TRANSPORTING PROFILES TOWARDS A WORKING MACHINE

FIELD

The invention relates to a method of processing profiles in a profile processing assembly. The invention also relates to a profile infeed assembly for transporting profiles towards a working machine.

BACKGROUND

Steel profiles are well know, e.g. for construction purposes. An example of such a well known steel profile is the I-beam. A typical steel profile is much too heavy for manual lifting. Machines which work on a steel profile, e.g. a drilling machine or band saw machine, therefore are provided with an infeed assembly for supporting the profile and transporting the profile towards the working machine.

Typically a roller conveyor is used to transport the profile in its longitudinal direction towards the working machine and to further support the profile in the machine, whilst working actions such as sawing, drilling and milling are performed. Usually a measuring truck is used to engage an end of the profile and guide the profile over an infeed roller conveyor which extends horizontally in a longitudinal direction.

In order to automate the feeding process and expedite the working process, it is well known to feed profiles automatically to the infeed roller conveyor. A much used solution to supply profiles to the infeed roller conveyor is the use of an infeed cross transport assembly which includes a plurality of spaced apart cross transport legs. These cross transport legs extend perpendicular to the longitudinal direction of the infeed roller conveyor. Top surfaces of the cross transport legs form a cross transport plane which, in operation, supports the profiles which need to be processed in the working machine. An example of such a configuration is disclosed on YouTube in the clip Voortman V505-160T—cross transports with integrated magnets. The profiles on the cross transport legs extend with their longitudinal axes parallel to the longitudinal direction of the infeed roller conveyor. When more than one profile is placed on the infeed cross transport assembly, the cross transport legs are used as a buffer area for these profiles. Usually, at least two cross transport loops are placed below the cross transport plane. Normally, each cross transport leg is provided with a cross transport loop. Each cross transport loop, which may be embodied as a chain, comprises a plurality of retractable drag-dogs which function as cam. Each drag-dogs has a protruding position in which position it protrudes above the cross transport plane and, in operation, engages the profile. Additionally, each drag-dogs has a retracted position in which position it remains below the cross transport plane. In operation, the drag-dogs in the protruding position move the profile(s) from the infeed cross transport assembly towards the infeed conveyor assembly. When a profile needs to be fed to the infeed roller conveyor, the drag-dogs push the profile perpendicular to its longitudinal profile axis onto the infeed roller conveyor. In doing so, the profile will be correctly orientated for further transport over the infeed roller conveyor along its longitudinal axis towards the working machine.

When a profile is transported from the cross transport legs onto the infeed roller conveyor, the measuring truck has been moved to the end of the infeed roller conveyor that is most remote from the working machine. So when a profile has been pushed by the measuring truck to the working machine, first the measuring truck has to be moved to the end of the infeed roller conveyor that is most remote from the working machine before a subsequent profile can be transported onto the infeed roller conveyor. This movement of the measuring truck takes time during which the working machine may be idle. When the measuring truck is in the end position, subsequently, the next profile to be worked on can be transported from the infeed cross transport assembly on the infeed roller conveyor. Subsequently, the measuring truck has to be moved towards the end of the profile that has just been transported onto the infeed roller conveyor. In case of a relatively short profile, this movement of the measuring truck may also take some considerable time during which the working machine may be idle.

EP 1 516 696 A1 discloses a supply assembly for rod material which includes a cross transport and a workpiece holder which is able to rotate a rod and which is moveable along in an axial direction parallel to a longitudinal axis of the rods to be processed for transporting a rod in its longitudinal direction. The workpiece holder axially transports a rod to a laser cutting workstation and rotates the rods to cut the rod in two pieces in the laser cutting workstation. An infeed conveyor assembly for feeding a rod in a longitudinal direction parallel its axis which infeed conveyor assembly comprises an infeed conveyor and a measuring truck is not disclosed in EP'696. The workpiece holder of EP'696 is relatively heavy and includes a chuck for engaging the rod. The workpiece holder carries a sensor with which both end of a rod can be sensed that is positioned in a waiting position of the cross transport. In this waiting position, a rod which still has to be worked on is waiting to be moved to a pick-up position in which the axis of the rod is in co-linear with the chuck of the workpiece holder and in which the rod is supported by stationary rod supports 17. When moving the workpiece holder along the axial direction, the sensor mounted on the workpiece holder senses both ends of the rod which is in the waiting position. These sensed ends of the waiting rod can be used determine to which position the workpiece holder has to be moved before the next rod, which is still in the waiting position is moved to the pick-up position. It is necessary for sensing both ends of the rod in the waiting position that the workpiece holder moves along the entire length of the rod in the waiting position. The sensing of the ends of the rod in the waiting position can only be performed after the working on the previous rod has been finalized and the workpiece holder moves back away from the workstation. This procedure time is consuming.

SUMMARY OF THE INVENTION

An object of the invention is to provide a method of processing profiles in a profile processing assembly which is more efficient than the known methods and in which the idle time of the working machine is reduced relative to the known methods of processing profiles in a profile processing assembly.

To that end, the invention provides a method of processing profiles in a profile processing assembly according to claim 1. More particular the invention provides a method of processing profiles in a profile processing assembly, wherein each profile extends along a longitudinal profile axis and has a first end and an opposite second end. The profile processing assembly comprises a working machine, and a profile infeed assembly for transporting the profiles towards the working machine. The profile infeed assembly includes an infeed cross transport assembly for feeding the profiles in a cross direction perpendicular to the longitudinal profile axes of the profiles, and an infeed conveyor assembly for feeding the profiles in a longitudinal direction parallel to the longitudinal profile axes of the profiles. The infeed conveyor assembly comprises an infeed conveyor and a measuring truck. The infeed conveyor has a first end remote from the working machine and a second end adjacent to the working machine. The infeed cross transport assembly is arranged to supply individual profiles to the infeed conveyor assembly. The infeed conveyor assembly is arranged to supply individual profiles to the working machine. The measuring truck engages a profile at the first end of the profile that is facing away from the working machine and is configured to guide the profile along its longitudinal profile axis over the infeed conveyor to the working machine. The measuring truck has a number of rest positions along the length of the infeed conveyor. The method comprises:

determining the longitudinal position of the first end of a profile that is facing away from the working machine for each profile that is to be fed to the infeed conveyor assembly by the infeed cross transport assembly, moving the measuring truck to an optimal rest position of the number of rest positions, which optimal rest position is the rest position between the first end of the infeed conveyor and the first end of the profile and which is the rest position which is closest to the first end of the profile, transporting the profile from the infeed cross transport assembly to the infeed conveyor assembly, and engaging the first end of the profile with the measuring truck for transporting the profile along its longitudinal profile axis to the working machine.

With the method according to the present invention the measuring truck is not moved back all the way to the first end of the infeed conveyor assembly, as is done in the prior art methods. According to the present invention, the longitudinal position of the first end of the profile that is to be fed is determined, and the measuring truck is placed just behind that position. This means that the measuring truck has to move less. Not only on its way back in the direction of the first end, in many cases less time is needed than in the prior art. Also after a new profile has been transported onto the infeed conveyor assembly, time loss is prevented because the measuring truck is very close to the first end of the new profile and does not have to travel all the way from the first end of the infeed conveyor assembly to the first end of the new profile. The effect is especially apparent when profiles are fed which are shorter than the maximum possible length. Theoretically the infeed time, i.e. the amount of time it takes for a profile to be transported from the infeed cross transport assembly to the working machine to be worked on, will decrease by about 8% for profiles having half of the maximum length. This means a decrease of idle time of the working machine by 8% and thus an increase of the productivity of the working machine which is considered to be considerable in this field.

The invention further provides a profile infeed assembly for transporting profiles towards a working machine. More particular the profile infeed assembly comprises an infeed cross transport assembly for feeding profiles in a cross direction perpendicular to the longitudinal profile axes of the profiles, and an infeed conveyor assembly for feeding the profiles in a longitudinal direction parallel to the longitudinal profile axes of the profiles. The infeed cross transport assembly is arranged to supply individual profiles to the infeed conveyor assembly. The infeed conveyor assembly is arranged to supply individual profiles to the working machine. The infeed conveyor assembly comprises an infeed conveyor, and a measuring truck. The infeed conveyor has a first end remote from the working machine and a second end adjacent to the working machine. The measuring truck engages a profile at the first end of the profile that is facing away from the working machine and is configured to guide the profile along its longitudinal profile axis over the infeed conveyor to the working machine. The measuring truck has a number of rest positions along the length of the infeed conveyor. The infeed cross transport assembly comprises a profile end detection system. The profile end detection system, in operation, determines the longitudinal position of the first end of the profile. The profile infeed assembly further comprises a control system which, in operation, uses a signal from the profile end detection system indicating the longitudinal position of the first end of the profile to move the measuring truck to an optimal rest position. The optimal rest position is the rest position of the number of rest positions which is between the first end of the infeed conveyor and the first end of the profile and which is the rest position which is closest to the first end of the profile.

With the profile infeed assembly according to the present invention the measuring truck is not retracted all the way towards the first end of the infeed conveyor, as is done in the prior art assemblies. According to the present invention, the longitudinal position of the first end of the profile that is to be fed onto the infeed conveyor is determined, and the measuring truck is placed just behind that position. This means that the measuring truck has to move less. Especially when profiles are fed which are shorter than the maximum possible length. The profile end detection system provides means to automatically determine the longitudinal position of the first end of the profile which is to be fed onto the infeed conveyor by the infeed cross transport assembly. An advantage of automatically determining said position is that a signal resulting from the profile end detection system can be used by the control system to automatically move the measuring truck in a more efficient manner, thereby reducing the travel time of the measuring truck. The control system may control the movement of the measuring truck such that the infeed time, i.e. the amount of time it takes for the profile to be transported from the infeed cross transport assembly to the working machine to be worked on, can be minimised. Theoretically, the infeed time will decrease by about 8% for profiles having half of the maximum length as a result of the reduced movement of the measuring truck. Consequently, the idle time of the working machine will be reduced as well by a amount which is considered in the field to be considerable.

The present invention will be further elucidated with reference to figures of exemplary embodiments. The embodiments may be combined or may be applied separately from each other.

DETAILED DESCRIPTION OF THE FIGURES

In this application similar or corresponding features are denoted by similar or corresponding reference signs. The description of the various embodiments is not limited to the examples shown in the figures and the reference numbers used in the detailed description and the claims are not intended to limit the description of the embodiments, but are included to elucidate the embodiments by referring to the example shown in the figures.

Figure 1:
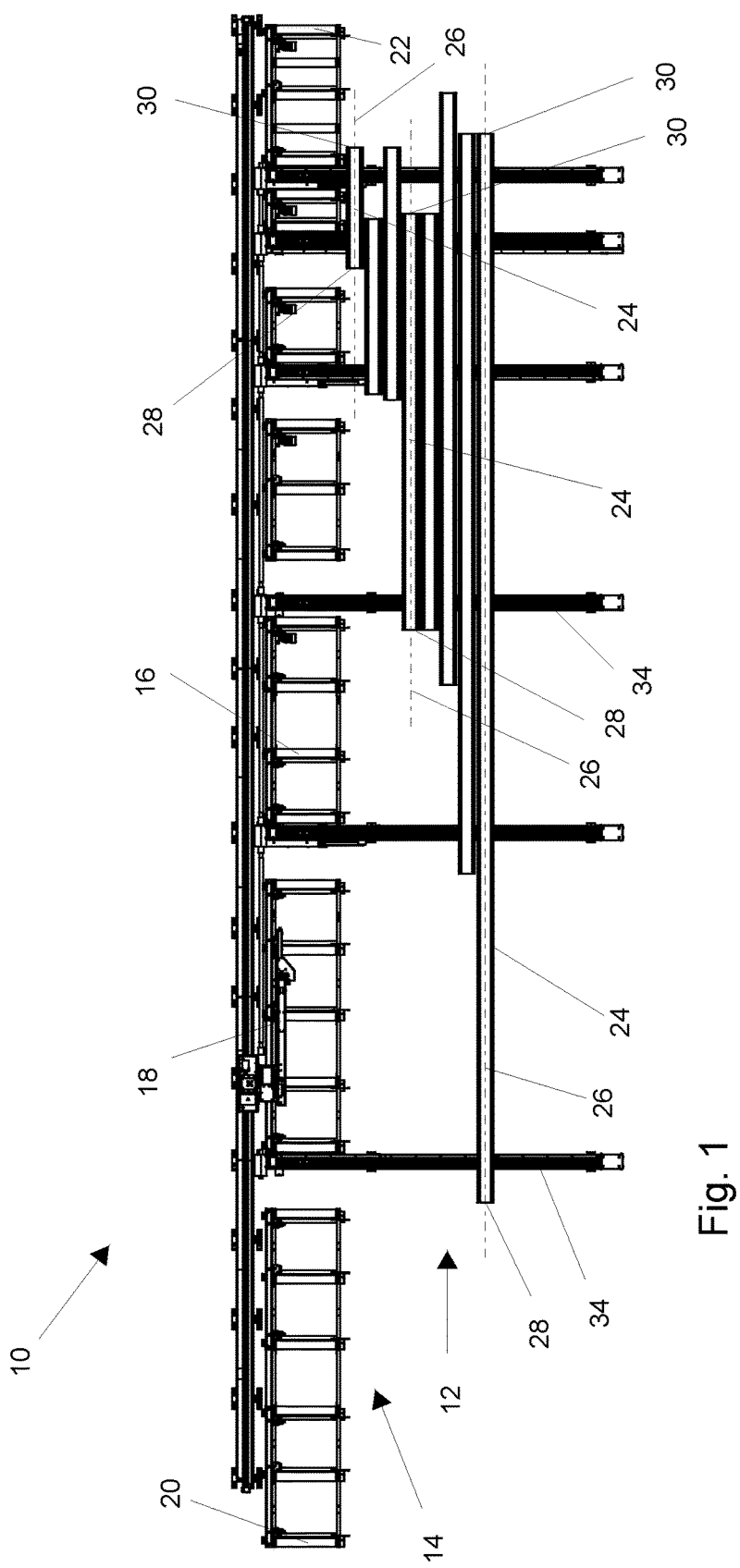
FIG. 1 shows a top view of an example of the profile infeed assembly according to the invention.
Figure 2:
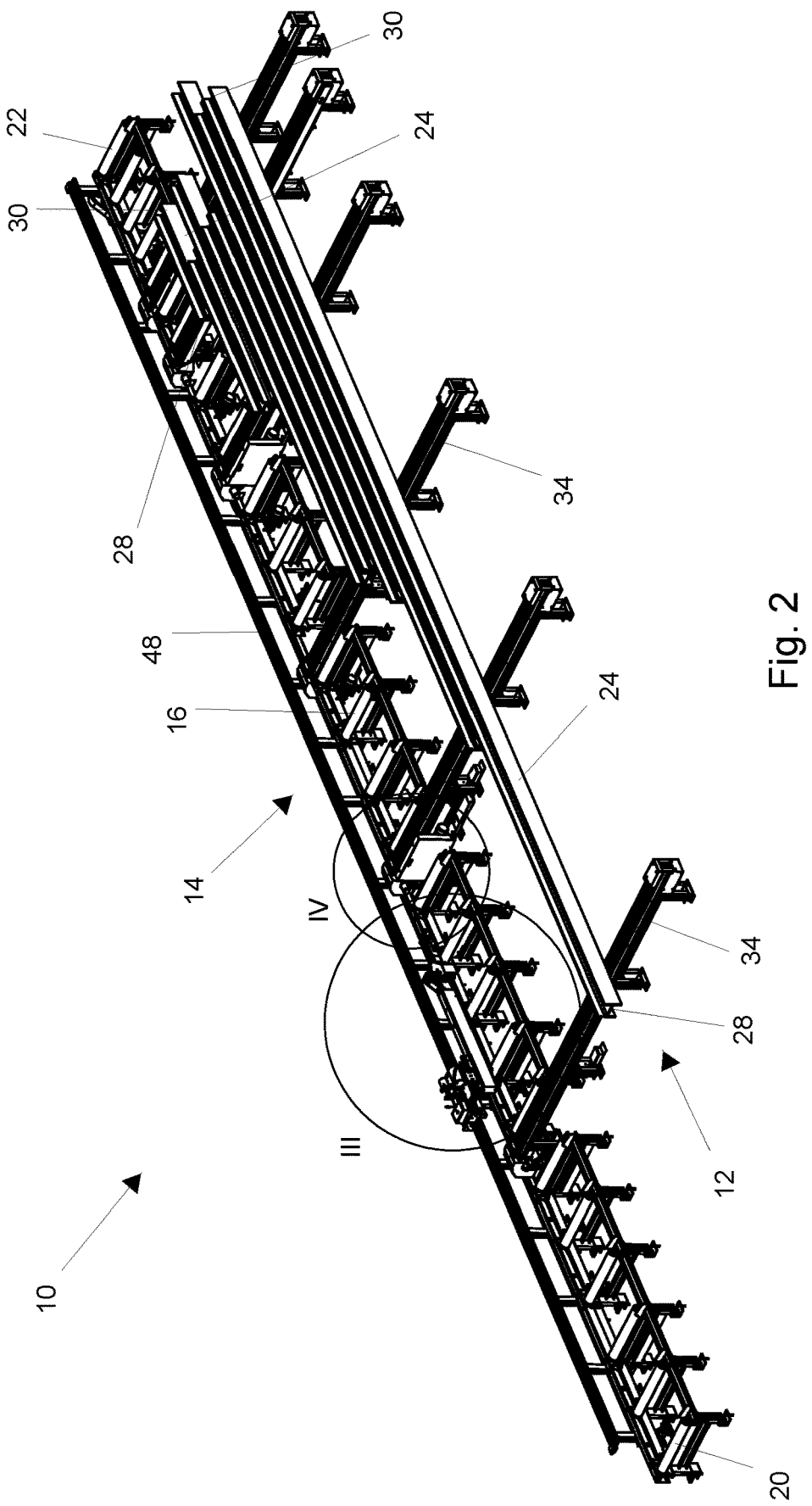
FIG. 2 shows perspective top/side view of the example of FIG. 1.
Figure 3:
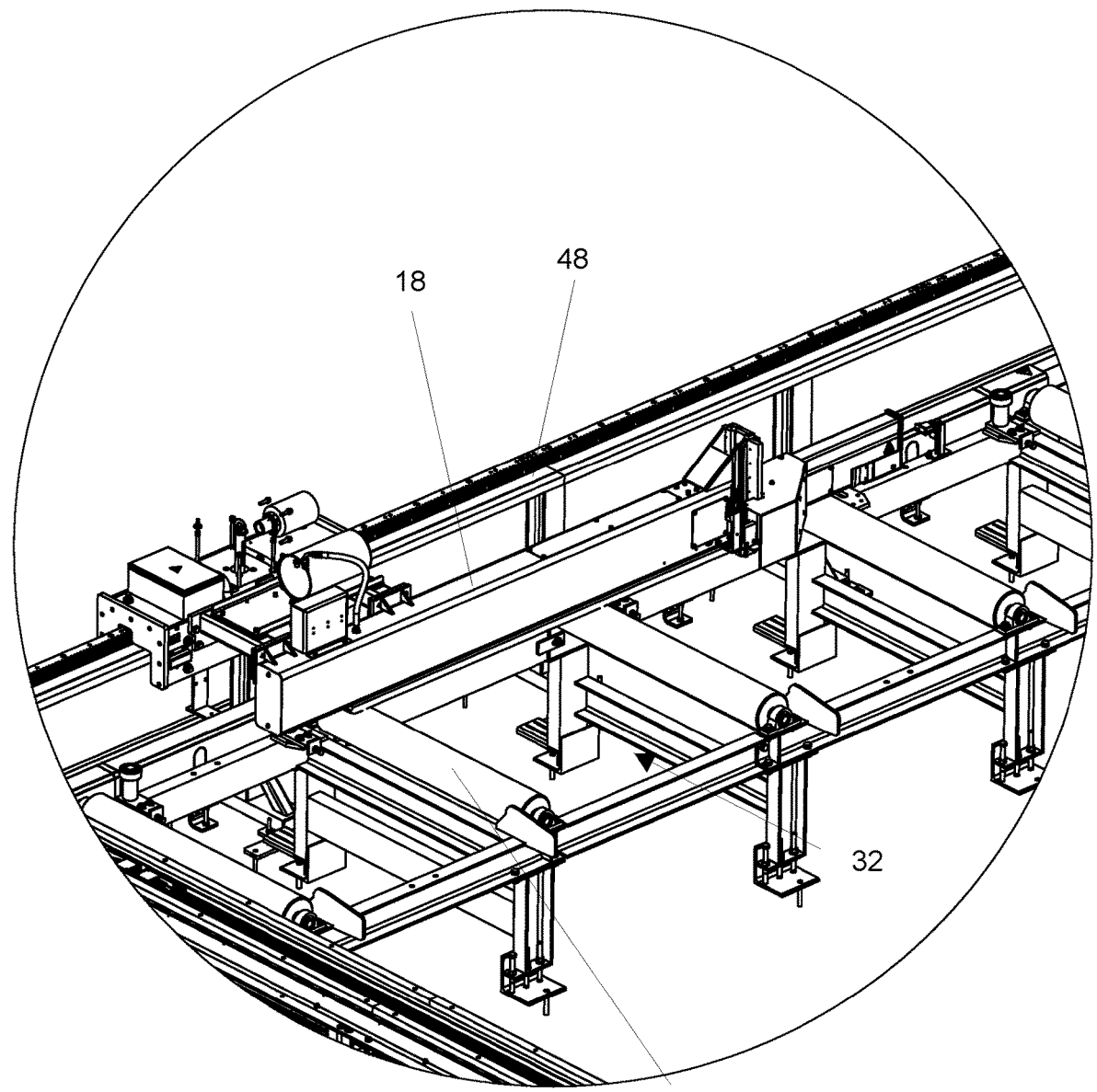
FIG. 3 shows a detail III of FIG. 2.

In the most general terms, the invention relates to a method of processing profiles 24 in a profile processing assembly. Each profile 24 extends along a longitudinal profile axis 26 and has a first end 28 and an opposite second end 30. The profile processing assembly comprises a working machine, and a profile infeed assembly 10 for transporting the profiles 24 towards the working machine. The profile infeed assembly 10 includes an infeed cross transport assembly 12 for feeding the profiles 24 in a cross direction perpendicular to the longitudinal profile axes 26 of the profiles 24, and an infeed conveyor assembly 14 for feeding the profiles 24 in a longitudinal direction parallel to the longitudinal profile axes 26 of the profiles 24. The infeed conveyor assembly 14 comprises an infeed conveyor 16 and a measuring truck 18 (see i.a. FIG. 3). The infeed conveyor 16 has a first end 20 remote from the working machine and a second end 22 adjacent to the working machine. The infeed cross transport assembly 12 is arranged to supply individual profiles 24 to the infeed conveyor assembly 14. The infeed conveyor assembly 14 is arranged to supply individual profiles 24 to the working machine. The measuring truck 18 engages a profile 24 at the first end 28 of the profile 24 that is facing away from the working machine and is configured to guide the profile 24 along its longitudinal profile axis 26 over the infeed conveyor 16 to the working machine. The measuring truck 18 has a number of rest positions 32 along the length of the infeed conveyor 16. The method comprises determining the longitudinal position of the first end 28 of a profile 24 that is facing away from the working machine for each profile 24 that is to be fed to the infeed conveyor assembly 14 by the infeed cross transport assembly 14. The method further comprises moving the measuring truck 18 to an optimal rest position 32 of the number of rest positions 32, which optimal rest position 32 is the rest position 32 between the first end 20 of the infeed conveyor 16 and the first end 28 of the profile 24 and which is the rest position 32 which is closest to the first end 28 of the profile 24. The method also comprises transporting the profile 24 from the infeed cross transport assembly 12 to the infeed conveyor assembly 14, and engaging the first end 28 of the profile 24 with the measuring truck 18 for transporting the profile 24 along its longitudinal profile axis 26 to the working machine.

The effects and advantages of the method of processing profiles 24 in a profile processing assembly have been described in the summary section and these effects and advantages are inserted here by reference.

The measuring truck 18 may be embodied as gripper truck which includes a gripper for engaging the profile 24 and which actually provides the force for transporting the profile 24 over, e.g. a roller conveyer and also determines the exact longitudinal position of the profile 24. Alternatively, the measuring truck 18 may be embodied as a pusher truck which abuts against the first end 28 of the profile and follows the movement of the profile 24 along its longitudinal axis. This movement may be realised by the infeed conveyor 16. By means of the position of the pusher truck the longitudinal position of the profile 24 is known.

In an embodiment the infeed conveyor 16 comprises a roller conveyor for supporting the profile 24 which has been received from the infeed cross transport assembly 12. The roller conveyor may be a driven roller conveyor comprising powered rollers which may transport the profile 24 to the working machine. Alternatively, the roller conveyor may be a passive roller conveyor comprising non-powered rollers, in which case the measuring truck 18 is embodied as a gripper truck which is configured to push the profile 24 to the working machine. The infeed conveyor 16 may further comprise a rail 48 on which the measuring truck 18 is moveably attached. The rail 48 is configured to allow the measuring truck 18 to move in the longitudinal direction of the infeed conveyor assembly 14. For movement of the measuring truck 18 it may be provided with a pinion which is driven by a motor and which is configured to engage a rack in the rail 48. A rack and pinion provides an accurate means of transport, without slipping, which is important for a precise movement and positioning of the measuring truck 18 along the rail 48.

In an embodiment the infeed cross transport assembly 12 comprises a plurality of spaced apart cross transport legs 34 extending perpendicular to the longitudinal direction of the infeed conveyor 16, and at least two cross transport loops 40 (e.g. a belt or chain) extending below the cross transport plane 38. The top surfaces 36 of the cross transport legs 34 form a cross transport plane 38, which, in operation, supports one or more profiles 24. Each of the at least two cross transport loops 40 comprises a plurality of retractable drag-dogs 42 (or cams). Each of the drag-dogs 42 has a protruding position in which position it protrudes above the cross transport plane 38 and, in operation, engages the profile 24. Each of the drag-dogs 42 has a retracted position in which position it remains below the cross transport plane 38. The drag-dogs 42 in the protruding position, in operation, move the profile 24 from the infeed cross transport assembly 12 towards the infeed conveyor assembly 14.

Figure 4:
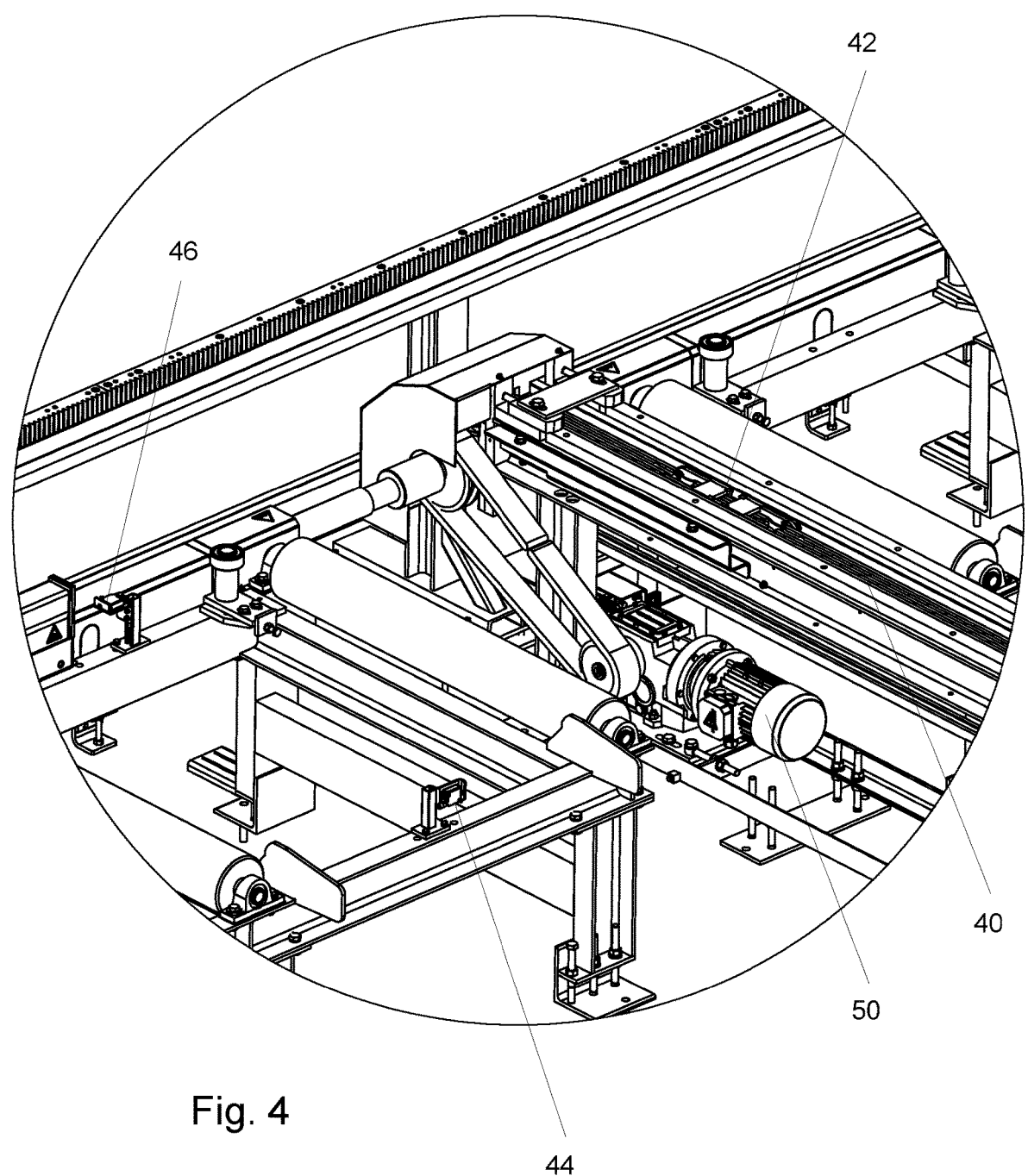
FIG. 4 shows a detail IV of FIG. 2 with a motor casing removed.
Figure 5:
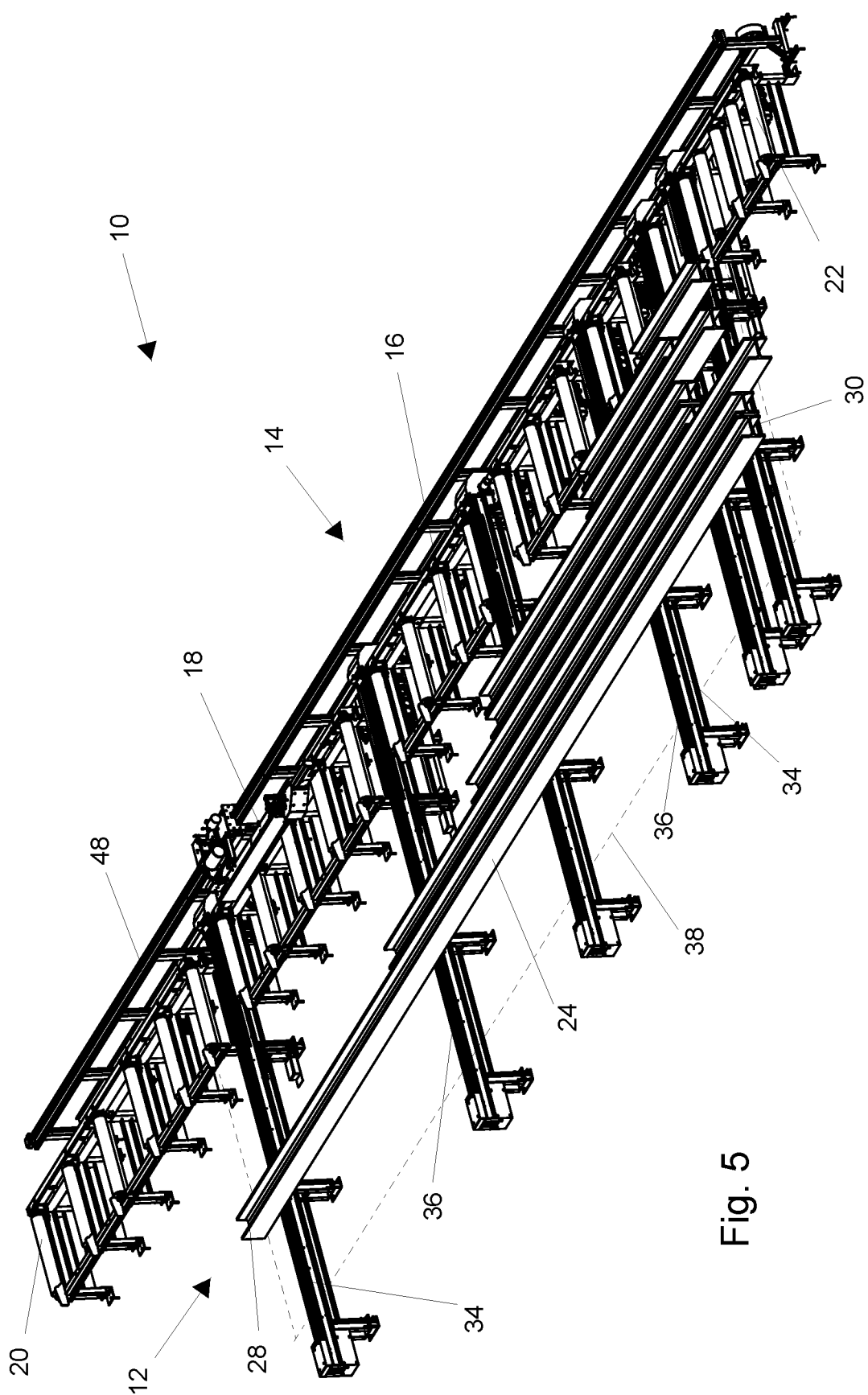
FIG. 5 shows another perspective top/side view of the example of FIG. 1.

Preferably each cross transport leg 34 is provided with one cross transport loop 40, preferably a chain. The cross transport loop 40 or chain may be integrated within the cross transport leg 34, as is shown in FIG. 4, and may be driven by a motor 50. The drag-dogs 42 may be pneumatically controlled to switch between their retracted and protruding positions. This means they can be operated automatically.

In an embodiment the cross transport plane 38 supports multiple profiles 24. The drag-dogs 42, in operation, move all profiles 24 along the cross transport plane 38 in the direction of the infeed conveyor assembly 14.

By being able to support multiple profiles 24, the cross transport plane 38 can buffer said profiles 24 and thereby ensure a constant supply of said profiles 24 to the infeed conveyor 16 and subsequently the working machine. In this way no time is wasted in waiting for the arrival of profile 24.

As an alternative to using cross transport legs 32, the infeed cross transport assembly 12 may comprise an automated guided vehicle having at least two liftable support legs. The profile 24 may rest on the at least two support legs and may be transferred to the infeed conveyor 16 by moving the profile 24 above the infeed conveyor 16 and subsequently lowering the support legs. If the infeed conveyor 16 comprises a roller conveyor, the liftable support legs of the automated guided vehicle may be configured such that they can pass between two rollers of the roller conveyor. Also other means for realising the infeed cross transport assembly 12 are feasible, e.g. a lift crane, a fork lift truck and the like.

In an embodiment, the profile infeed assembly 10 comprises a profile end detection system, wherein the profile end detection system performs the step of determining the longitudinal position of the first end 28 of the profile 24 which is to be subsequently fed to the infeed conveyor 16.

The profile end detection system provides means to automatically determine the longitudinal position of the first end 20 of the profile 24. An advantage of automatically determining said position is that a signal resulting from the profile end detection system can be further used to automatically move and position the measuring truck 18. Said profile end detection system may comprise detection systems which are known in the art. For example a laser-detector assembly determining whether there is a part of the profile between the laser and the detector. Another example of a profile end detection system could be a camera and image recognition software, wherein the image recognition software would determine the position of the profile 24 based on an image taken by the camera.

In an embodiment the profile end detection system may comprises a row of photocells 44 placed adjacent to the infeed conveyor 16. The row of photocells 44 are spaced apart form each other in a longitudinal direction of the infeed conveyor 16. Each photocell 44 indicates the presence or absence of the profile 24 at its position. The optimal rest position may be the rest position 32 which is between the first end 20 of the infeed conveyor 16 and a first non-occupied photocell 44 indicating there is no profile 24 present at its position and which is the rest position 32 which is closest to the first non-occupied photocell 44. The first non-occupied photocell indicating there is no profile 24 present at its position may be between the first end 20 of the infeed conveyor 16 and an occupied photocell 44 indicating there is a profile 24 present at its position, and which is the non-occupied photocell 44 which is closest to the occupied photocell 44.

Photocells 44 are reliable and relatively cheap. Thus, with a minimal investment in hardware and an improved control of the movement and positioning of the measuring truck 18, an efficiency improvement of the infeed assembly 10 can be obtained as a consequence of which the idle time of the working machine is reduced.

The infeed conveyor assembly 14 may also comprise a row of photocells 46 placed on the infeed conveyor 16 and spaced apart in a longitudinal direction of the infeed conveyor 16. Each photocell 46 indicates the presence or absence of the profile 24 when it has been placed on the infeed conveyor 16 by the infeed cross transport assembly 12. These photocells 46 can detect whether there is a profile 24 present for the measuring truck 18 to engage, and where such a profile 24 is located.

In an embodiment the profile infeed assembly 10 further comprises a control system, which, in operation, performs the step of moving the measuring truck 18 to the optimal rest position. In operation, the control system may use a signal from the profile end detection system indicating the longitudinal position of the first end 28 of the profile 24 as an input signal, and may generate a control signal for moving the measuring truck 18 to the optimal rest position.

The control system enables an automated infeed from the infeed cross transport assembly 12 to the infeed conveyor 16 and an optimal positioning of the measuring truck 18, whereby the amount of movement of the measuring truck 18 is minimized by taking into account the lengths of the profiles 24 which are to be positioned on the infeed conveyor 16. The control system may be part of the profile infeed assembly, or it may be implemented in a separate computer or IC. The control system may be dedicated hardware, implemented with dedicated software. Regardless of implementation the control system may control the movement of the measuring truck 18 such that the infeed time, i.e. the amount of time it takes for the profile 24 to be moved from the infeed cross transport assembly 12 to the working machine, is minimised.

The invention also relates to a profile infeed assembly 10 for transporting profiles 24 towards a working machine. The profile infeed assembly 10 comprises an infeed cross transport assembly 12 for feeding profiles 24 in a cross direction perpendicular to the longitudinal profile axes 26 of the profiles 24, and an infeed conveyor assembly 14 for feeding the profiles 24 in a longitudinal direction parallel to the longitudinal profile axes 26 of the profiles 24. The infeed cross transport assembly 12 is arranged to supply individual profiles 24 to the infeed conveyor assembly 14. The infeed conveyor assembly 14 is arranged to supply individual profiles 24 to the working machine. The infeed conveyor assembly 14 comprises an infeed conveyor 16, and a measuring truck 18. The infeed conveyor has a first end 20 remote from the working machine and a second end 22 adjacent to the working machine. The measuring truck 18 engages a profile 24 at a first end 28 of the profile 24 that is facing away from the working machine and is configured to guide the profile 24 along its longitudinal profile axis 26 over the infeed conveyor 16 to the working machine. The measuring truck 18 has a number of rest positions 32 along the length of the infeed conveyor 16. The profile infeed assembly 10 comprises a profile end detection system which is configured to determine the longitudinal position of the first end 28 of the profile 24 which is to be supplied to the infeed conveyor. The profile infeed assembly 10 further comprises a control system which is configured to use a signal from the profile end detection system indicating the longitudinal position of the first end 28 of the profile 24 to control the movement of the measuring truck 18 to an optimal rest position, which is the rest position 32 of the number of rest positions 32 which is between the first end 20 of the infeed conveyor 16 and the first end 28 of the profile 24 and which is the rest position 32 which is closest to the first end 28 of the profile 24.

The effects and advantages of the profile indeed assembly 10 have been described in the summary section and these effects and advantages are inserted here by reference.

In an embodiment the infeed conveyor 16 comprises a roller conveyor for supporting the profile 24 which has been received from the infeed cross transport assembly 12. The roller conveyor may be a driven roller conveyor comprising powered rollers which may transport the profile 24 to the working machine. Alternatively, the roller conveyor may be a passive roller conveyor comprising non-powered rollers, in which case the measuring truck 18 is embodied as a gripper truck which may push the profile 24 to the working machine.

The infeed conveyor 16 may further comprise a rail 48 on which the measuring truck 18 is moveably attached. The rail 48 is configured to allow the measuring truck 18 to move in the longitudinal direction of the infeed conveyor assembly 14. For movement of the measuring truck 18 it may be provided with a pinion which is driven by a motor and which is configured to engage a rack in the rail 48.

In an embodiment the infeed cross transport assembly 12 comprises a plurality of spaced apart cross transport legs 34 extending perpendicular to the longitudinal direction of the infeed conveyor 16. Top surfaces 36 of the cross transport legs 34 form a cross transport plane 38 which, in operation, supports the profiles 24. The infeed cross transport assembly 12 further comprises at least two cross transport loops 40 (e.g. a belt or chain) extending below the cross transport plane 38. Each of the at least two cross transport loops 40 comprises a plurality of retractable drag-dogs 42 (cams). Each of the drag-dogs 42 has a protruding position in which position it protrudes above the cross transport plane 38 and, in operation, engages the profile 24. Each of the drag-dogs 42 has a retracted position in which position it remains below the cross transport plane 38. The drag-dogs 42 are configured to move the profile 24 from the infeed cross transport assembly 12 towards the infeed conveyor assembly 14.

Preferably, each cross transport leg 34 is provided with one cross transport loop 40, preferably a chain. The cross transport loop 40 or chain may be integrated within the cross transport leg 34, as is shown in FIG. 4. The drag-dogs 42 may be pneumatically controlled to switch between their retracted and protruding positions so that they can be operated automatically.

In an embodiment, the cross transport plane 38 is configured to support a plurality of profiles 24. The drag-dogs 42 are configured to move all profiles 24 simultaneously along the cross transport plane 38 in the direction of the infeed conveyor assembly 14.

By being able to support multiple profiles 24, the cross transport plane 38 can buffer said profiles 24 and thereby ensuring a constant supply of said profiles 24 to the infeed conveyor 16 and subsequently the working machine. In this way no time is wasted in waiting for the arrival of the profile 24.

As an alternative to using cross transport legs 32, the infeed cross transport assembly 12 may comprise an automated guided vehicle having at least two liftable support legs. The profile 24 may rest on the at least two support legs and may be transferred to the infeed conveyor 16 by moving the profile 24 above the infeed conveyor 16 and subsequently lowering the support legs. If the infeed conveyor 16 comprises a roller conveyor, the liftable support legs of the automated guided vehicle may be configured such that they can pass between two rollers of the roller conveyor. Also other means for realising the infeed cross transport assembly 12 are feasible, e.g. a lift crane, a fork lift truck and the like.

In an embodiment, the profile end detection system may comprise a row of photocells 44 placed adjacent to the infeed conveyor 16. The row of photocells 44 are spaced apart from each other in the longitudinal direction of the infeed conveyor 16. Each photocell 44 is configured to indicate the presence or absence of the profile 24 at its position. The control system is configured to move the measuring truck 18 to the optimal rest position. The optimal rest position is the rest position 32 which is between the first end 20 of the infeed conveyor 16 and a first non-occupied photocell 44 indicating there is no profile 24 present at its position and which is the rest position 32 which is closest to the first non-occupied photocell 44. The first non-occupied photocell 44 indicating there is no profile 44 present at its position is between the first end 20 of the infeed conveyor 16 and a first occupied photocell 44 indicating there is a profile 24 present at its position, and which is the non-occupied photocell 44 which is closest to the first occupied photocell 44.

The advantages of using photocells in the profile end detection system have been described above with reference to the method embodiment and are also valid for this embodiment of the profile feed assembly.

The invention furthermore relates to a profile processing assembly comprising a working machine, and the profile infeed assembly 10 according to the invention.

The effects and the advantages of the profile processing assembly are the same as the effects and advantages of the profile infeed assembly 10 according to the invention and these effects and advantages are inserted here by reference.

The various embodiments which are described above may be used implemented independently from one another and may be combined with one another in various ways. The reference numbers used in the detailed description and the claims do not limit the description of the embodiments nor do they limit the claims. The reference numbers are solely used to clarify.

LEGEND

10—profile infeed assembly
12—infeed cross transport assembly
14—infeed conveyor assembly
16—infeed conveyor
18—measuring truck
20—first end (of the infeed conveyor)
22—second end (of the infeed conveyor)
24—profile
26—longitudinal profile axis
28—first end (of the profile)
30—second end (of the profile)
32—rest position
34—cross transport leg
36—top surface (of the cross transport leg)
38—cross transport plane
40—cross transport belt or chain
42—drag-dog
44—photocell (of the infeed cross transport assembly)
46—photocell (of the infeed conveyor assembly)
48—rail

The invention claimed is:

1. A method of processing profiles in a profile processing assembly, wherein each profile extends along a longitudinal profile axis and has a first end and an opposite second end, the profile processing assembly comprising:
   a working machine; and
   a profile infeed assembly for transporting the profiles towards the working machine,
   wherein the profile infeed assembly includes:
      an infeed cross transport assembly for feeding the profiles in a cross direction perpendicular to the longitudinal profile axes of the profiles; and
      an infeed conveyor assembly for feeding the profiles in a longitudinal direction parallel to the longitudinal profile axes of the profiles, wherein the infeed conveyor assembly comprises an infeed conveyor and a measuring truck, wherein the infeed conveyor comprises a roller conveyor for supporting the profile which has been received from the infeed cross transport assembly and wherein the infeed conveyor has a first end remote from the working machine and a second end adjacent to the working machine,
   wherein the infeed cross transport assembly is arranged to supply individual profiles to the infeed conveyor assembly and wherein the infeed conveyor assembly is arranged to supply individual profiles to the working machine, wherein the measuring truck engages a profile at the first end of the profile that is facing away from the working machine and is configured to guide the profile along the longitudinal profile axis thereof over the infeed conveyor to the working machine, and wherein the measuring truck has a pre-defined number of rest positions spaced apart from each other along the length of the infeed conveyor, wherein the profile infeed assembly comprises a profile end detection system, wherein the profile end detection system performs the step of determining the longitudinal position of the first end of the profile which is to be subsequently fed to the infeed conveyor, wherein the profile end detection system comprises a row of photocells placed adjacent to the infeed conveyor, wherein the row of photocells are spaced apart from each other in a longitudinal direction of the infeed conveyor, wherein each photocell indicates the presence or absence of the profile at its position, wherein the method comprises:

determining the longitudinal position of the first end of a profile that is facing away from the working machine for each profile that is to be fed to the infeed conveyor assembly by the infeed cross transport assembly;

moving the measuring truck to an optimal rest position of the pre-defined number of rest positions, wherein the optimal rest position of the pre-defined rest positions is between the first end of the infeed conveyor and a first non-occupied photocell indicating there is no profile present at its position and is closest to the first non-occupied photocell, wherein the first non-occupied photocell indicating there is no profile present at its position is between the first end of the infeed conveyor and an occupied photocell indicating there is a profile present at its position, and which is the non-occupied photocell closest to the occupied photocell;

transporting the profile from the infeed cross transport assembly to the infeed conveyor assembly; and engaging the first end of the profile with the measuring truck for transporting the profile along the longitudinal profile axis thereof to the working machine.

2. The method according to claim 1, wherein the profile infeed assembly further comprises a control system, the control system, in operation, performing the step of moving the measuring truck to the optimal rest position.

3. The method according to claim 1, wherein the control system uses a signal from the profile end detection system indicating the longitudinal position of the first end of the profile as an input signal, and generates a control signal for moving the measuring truck to the optimal rest position.

4. The method according to claim 1, wherein the infeed cross transport assembly comprises:

a plurality of spaced apart cross transport legs extending perpendicular to the longitudinal direction of the infeed conveyor, wherein top surfaces of the cross transport legs form a cross transport plane, the cross transport plane, in operation, supporting the profile; and at least two cross transport loops extending below the cross transport plane and comprising a plurality of retractable drag-dogs, wherein each of the drag-dogs has a protruding position protruding above the cross transport plane and, in operation, engaging the profile, and wherein each of the drag-dogs has a retracted position remaining below the cross transport plane, wherein the drag-dogs in the protruding position, in operation, move the profile from the infeed cross transport assembly towards the infeed conveyor assembly.

5. The method according to claim 4, wherein the cross transport plane supports multiple profiles, and wherein the drag-dogs, in operation, move all profiles along the cross transport plane in the direction of the infeed conveyor assembly.

6. A profile infeed assembly for transporting profiles towards a working machine, wherein the profile infeed assembly comprises:

an infeed cross transport assembly for feeding profiles in a cross direction perpendicular to the longitudinal profile axes of the profiles; and an infeed conveyor assembly for feeding the profiles in a longitudinal direction parallel to the longitudinal profile axes of the profiles, wherein the infeed cross transport assembly is arranged to supply individual profiles to the infeed conveyor assembly and wherein the infeed conveyor assembly is arranged to supply individual profiles to the working machine, wherein the infeed conveyor assembly comprises:

an infeed conveyor comprising a roller conveyor for supporting the profile which has been received from the infeed cross transport assembly, wherein the infeed conveyor has a first end remote from the working machine and a second end adjacent to the working machine; and a measuring truck, wherein the measuring truck engages a profile at a first end of the profile that is facing away from the working machine and is configured to guide the profile along the longitudinal profile axis thereof over the infeed conveyor to the working machine, wherein the measuring truck has a number of predefined rest positions spaced from each other along the length of the infeed conveyor, wherein the profile infeed assembly comprises a profile end detection system configured to determine the longitudinal position of the first end of the profile which is to be supplied to the infeed conveyor, wherein the profile end detection system comprises a row of photocells placed adjacent to the infeed conveyor, wherein the row of photocells are spaced apart from each other in the longitudinal direction of the infeed conveyor, and wherein each photocell is configured to indicate the presence or absence of the profile at its position, and wherein the profile infeed assembly further comprises a control system configured to use a signal from the profile end detection system indicating the longitudinal position of the first end of the profile to control the movement the measuring truck to an optimal rest position of the pre-defined number of rest positions, wherein the optimal rest position of the pre-defined rest positions is between the first end of the infeed conveyor and a first non-occupied photocell indicating there is no profile present at its position and is closest to the first non-occupied photocell, wherein the first non-occupied photocell indicating there is no profile present at its position is between the first end of the infeed conveyor and a first occupied photocell indicating there is a profile present at its position, and which is the non-occupied photocell closest to the first occupied photocell.

7. The profile infeed assembly according claim 6, wherein the infeed cross transport assembly comprises:

a plurality of spaced apart cross transport legs extending perpendicular to the longitudinal direction of the infeed conveyor, wherein top surfaces of the cross transport legs form a cross transport plane, the cross transport plane, in operation, supporting the profile; and at least two cross transport loops extending below the cross transport plane and comprising a plurality of retractable drag-dogs, wherein each of the drag-dogs has a protruding position protruding above the cross transport plane and, in operation, engaging the profile, and wherein each of the drag-dogs has a retracted position remaining below the cross transport plane, wherein the drag-dogs in the protruding position are configured to move the profile from the infeed cross transport assembly towards the infeed conveyor assembly.

8. The profile infeed assembly according to claim 7, wherein the cross transport plane is configured to support a plurality profiles, and wherein the drag-dogs are configured to move all profiles simultaneously along the cross transport plane in the direction of the infeed conveyor assembly.

9. A profile processing assembly comprising:
a working machine; and
the profile infeed assembly according to claim 6.

* * * * *